3,102,992
SIMULTANEOUS PLURAL SPACING
ACOUSTICAL LOGGING
Kerry D. Savage, Houston, Roy P. Mazzagatti, Bellaire, and Gerhard Herzog, Houston, Tex., assignors to Texaco Inc., New York, N.Y., a corporation of Delaware
Filed Sept. 28, 1959, Ser. No. 842,923
12 Claims. (Cl. 340—18)

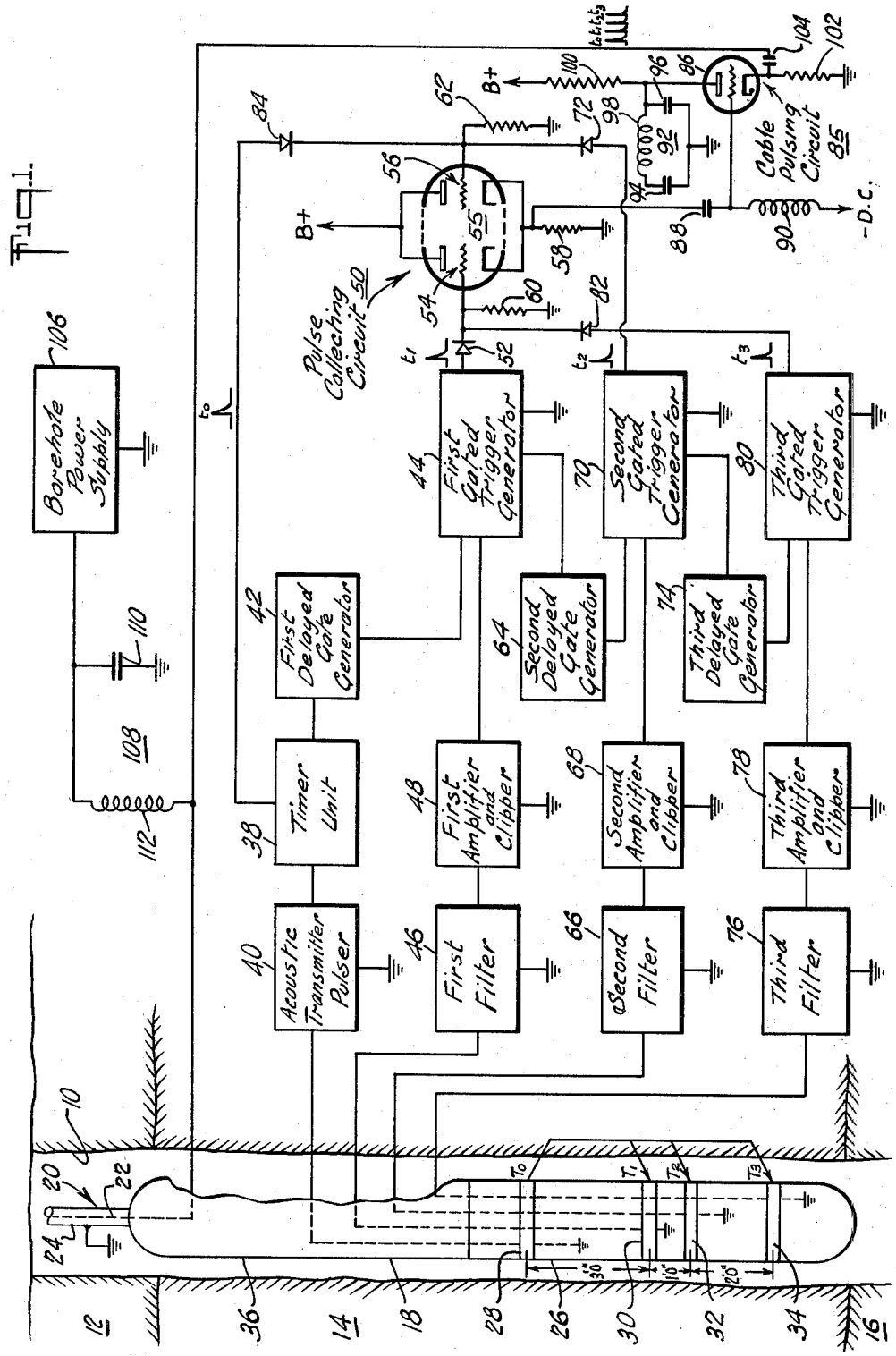
Sept. 3, 1963     K. D. SAVAGE ETAL     3,102,992
SIMULTANEOUS PLURAL SPACING ACOUSTICAL LOGGING
Filed Sept. 28, 1959     2 Sheets-Sheet 1

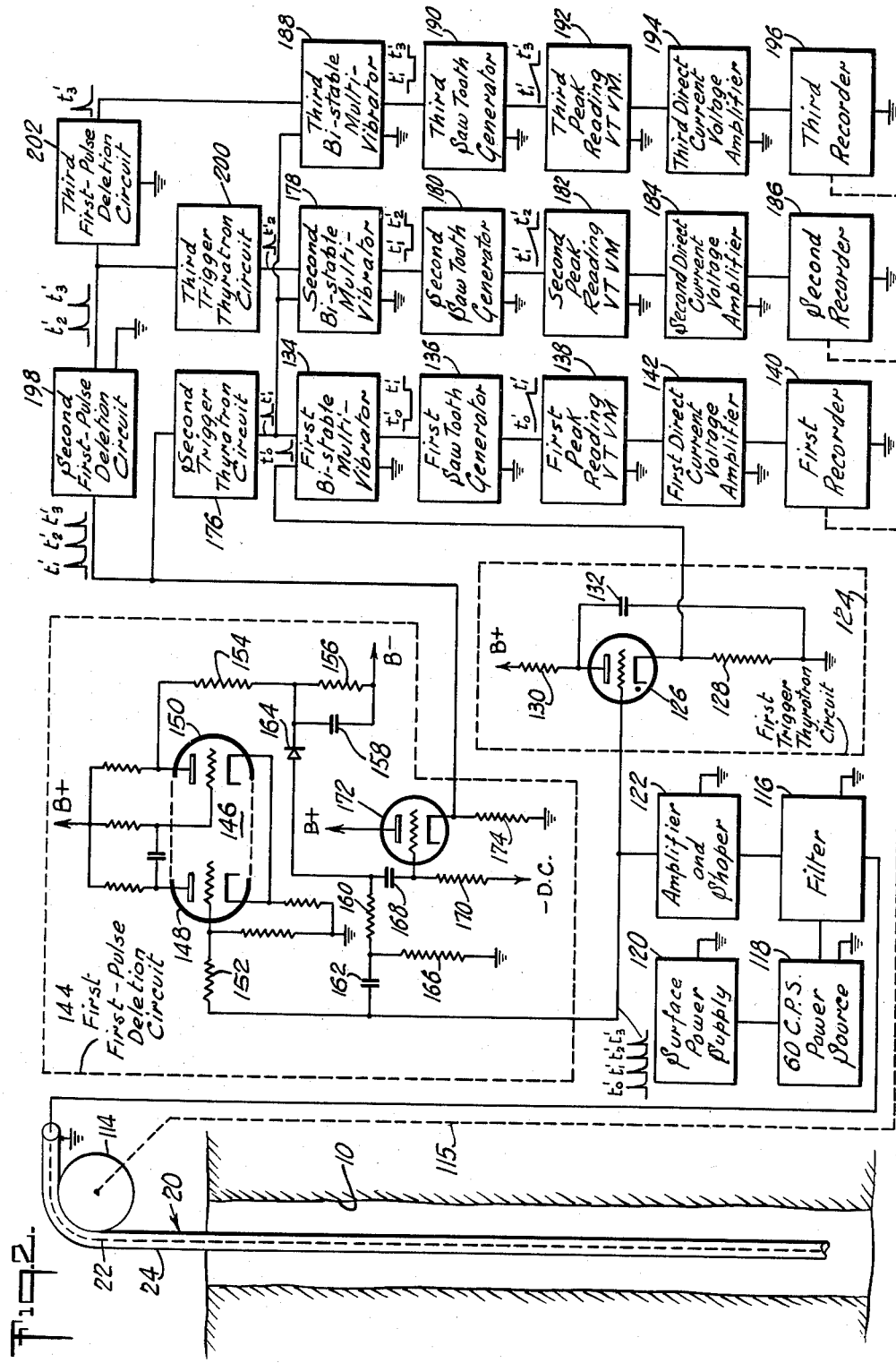

This invention relates to the determination of an acoustical property of subsurface strata which has been traversed by a borehole, and more particularly to a well logging system which provides a plurality of acoustical velocity logs simultaneously.

In the present state of the art of acoustical velocity well logging acoustical velocity logs of formations surrounding a borehole are being provided by the use of a one receiver system, that is, a system having one acoustical transmitting transducer and one acoustical receiving transducer, or by a two receiver system, that is, a system having one acoustical transmitting transducer and two acoustical receiving transducers, as disclosed in a copending application Serial No. 574,844, filed March 29, 1956, of R. J. Loofbourrow which issued on April 5, 1960, as U.S. Patent 2,931,455, entitled Acoustic Logging of Wells. The difference in arrival times of an acoustic pulse at two of the spaced apart transducers is measured. The spacings between the transducers being a constant, the measurement of time of travel of an acoustic pulse from one transducer to another can be converted into and recorded as the velocity of the acoustic wave or pulse through the various subsurface formations.

The choice of distance between the two transducers involves several factors. The percent error in velocity measurement caused by changes in hole size or by time measuring and recording equipment is reduced with a long spacing between transducers. Thus, a more accurate velocity measurement is generally provided with a long spacing for example, three or more feet. Furthermore, a log produced by a system which has a relatively long spacing between transducers is more useful in computing and plotting total time-of-travel of the acoustic pulse with depth for seismic calculations. In many instances, the longer spacing is found to be more desirable or satisfactory for correlating between wells. Accordingly, it can be seen that a long spacing between receivers is more desirable for many purposes.

However, considerable experience in logging boreholes with acoustical velocity logging systems has shown that velocity logs with a short spacing between transducers, say, on the order of one foot or even less, provide very detailed information of the subsurface formation. Since the velocity measurement is restricted to the interval between two transducers, and since that interval can be as short as a few inches, the systems employing short spaced transducers can very accurately locate boundaries of beds, even of thin beds. Accordingly, it can be seen that an acoustical velocity well logging system which can provide logs from both short spaced and long spaced transducers is very desirable.

In accordance with the present invention, an acoustical well logging system having several transducers is provided which produces a plurality of acoustical logs. More particularly, the present invention provides a system wherein a plurality of acoustical logs is produced simultaneously. The system of the present invention includes an elongated tool which contains one acoustic transmitter and a plurality of acoustic receivers, the receivers being located at different distances from the transmitter.

For a better understanding of the invention, reference may be had to the accompanying drawing in which:

FIG. 1 is a circuit diagram primarily in block form illustrating the subsurface or borehole equipment in accordance with the present invention including a sectional view of the earth and parts of the apparatus disposed in a borehole therein, and FIG. 2 is a circuit diagram primarily in block form illustrating the surface equipment of the system of the present invention including a sectional view of the earth and parts of the apparatus disposed in a borehole therein.

As stated above, the acoustical velocity through subsurface formations is determined by measuring the time of travel of an acoustic pulse through the subsurface formations between two spaced apart transducers. It can be seen that the time of travel may be measured between an acoustical transmitting transducer and an acoustical receiving transducer spaced apart a known distance. Alternatively, the velocity of a sound wave passing through a subsurface formation may be determined by measuring the time of travel of the sound wave between two spaced apart receiving transducers. The present invention, as illustrated in FIGS. 1 and 2 of the drawing, provides an acoustical well logging system wherein the time of travel is determined between a transmitting transducer and a receiving transducer and between at least two spaced apart receiving transducers. However, in the interest of accuracy, the time of travel of an acoustic pulse is measured preferably between two receiving transducers, since in the one receiver method the time of travel of the acoustic pulse through the borehole fluid from the transmitting transducer to the formation and again from the formation to the receiving transducer provides inaccuracies which cannot be readily corrected. These inaccuracies are substantially eliminated when a two receiver system is used since the time of travel through the borehole fluid to each of the two receivers can be considered as being equal.

Referring in more detail to FIG. 1 of the drawing, a borehole 10 containing a borehole liquid, which may be conventionally used borehole drilling mud, is shown traversing a plurality of subsurface formations 12, 14 and 16, in which formations it is desired to determine the acoustical velocity. Disposed within the borehole is an exploring unit or elongated tool 18 supported by a conventional $5/16$" single conductor borehole cable 20. The single conductor cable 20 includes a central conductor 22 generally composed of copper or other highly conductive metal and an outer sheath 24 made of steel strands having a strength sufficient to support the exploring unit 18 and its own weight in the borehole. The exploring unit 18 has an acoustical section 26 in the lower end thereof in which an acoustic pulse transmitting transducer 28, a first receiving transducer 30, a second receiving transducer 32 and a third receiving transducer 34 are contained. Each of the transducers is preferably of the lead zirconate titanate type or of the barium titanate type. The walls and the interior of the acoustical section 26 of the exploring unit 18 are made of a material in which the acoustic velocity of sound is not greater than the acoustic velocity of sound passing through the fluid in the borehole 10, preferably a material in which velocities are less than 5,000 feet per second and which can withstand the high temperatures and pressures encountered in a borehole, for example, a rubber-like material such as neoprene. The upper section of the exploring unit 18 is the electronic section 36 wherein the exploring unit electronic components are housed.

The electronic section 36 houses a timer unit 38 which may be any desirable oscillator producing pulses preferably at a constant repetition rate of frequency, for example, at 20 pulses per second. An acoustical pulse transmitter 40 which may be a conventional circuit for producing sharp high energy electric pulses is coupled to the output of the timer unit 38 and is connected at its output to the transmitting transducer 28. Also connected to the ouput of the timer unit 38 is a first delayed gate generator 42 which produces at its output a square positive voltage. The first delayed gate generator 42 may include a first one shot multivibrator having a differentiator at the output circuit thereof and a second one shot multivibrator responsive to a pulse from the differentiator. The output from the first delayed gate generator is coupled to a first gated trigger generator 44.

The first receiving transducer 30 in the acoustical section 26 of the exploring unit 18 is coupled to a first high-pass filter 46 which preferably has a cut-off frequency of approximately 5 kilocycles. A conventional amplifier and clipper 48 is connected to the output of the first filter 46. The output voltage from the first amplifier and clipper 48 is applied to an input of the first gated trigger generator 44. The first gated trigger generator 44 may conveniently be a dual control coincidence thyratron having two control grids, one having applied thereto the positive voltage from the output of the first delayed gate generator 42 and the other control grid having applied thereto the pulse from the first receiver 30 which passes through the first filter 46 and the first amplifier and clipper 48. The first gated trigger generator 44 is coupled to an electric pulse collecting circuit 50 through a first blocking diode 52, the pulse collecting circuit 50 being preferably a dual cathode follower 55 having a first triode section 54 and a second triode section 56, a common cathode resistor 58, a first grid resistor 60 connected to the control grid of the first triode section 54 and a second grid resistor 62 connected to the control grid of the second triode section 56. The output of the blocking diode 52 is connected to the control grid of the first triode section 54.

An output voltage from the first gated trigger generator 44 is also applied to a second delayed gate generator 64, which may be similar to the first delayed gate generator 42, to produce at its output a positive square wave.

Coupled to the output of the second receiving transducer 32 is a second filter 66 which is also preferably a high-pass filter having a cut-off frequency of approximately 5 kilocycles per second. A second amplifier and clipper 68 is connected to the output of the second filter 66. The output of the second amplifier and clipper 68 is connected to the input of a second gated trigger generator 70 which may be similar to the first gated trigger generator 44, the output of the second delayed gate generator 64 being connected also to the input of the second gated generator 70. One output from the second gated trigger generator 70 is connected to the pulse collecting circuit 50 through a second blocking diode 72, the second blocking diode 72 being connected to the control grid of the second triode section 56 of the dual cathode follower 55.

A second output from the second gated trigger generator 70 is connected to the input of a third delayed gate generator 74 which may be similar to the first and second delayed gate generators 42 and 64.

Coupled to the output of the third receiving transducer 34 is a third filter 76 which is also preferably a high-pass filter having a cut-off frequency of approximately 5 kilocycles per second. A third amplifier and clipper 78 couples the output of the third filter 76 to an input of a third gated trigger generator 80. The output from the third delayed gate generator 74 is also connected to an input of the third gated trigger generator 80. The third gated trigger generator is preferably similar to the first and second gated trigger generators 44 and 70. The output from the third gated trigger generator 80 is coupled to the pulse collecting circuit 50 through a third blocking diode 82 which is connected to the control grid of the first triode section 54 of the dual cathode follower 55.

An output from the timer unit 38 is also connected to the pulse collecting circuit 50 through a fourth blocking diode 84, which diode is connected to the control grid of the second triode section 56 of the dual cathode follower 55.

The cathodes of the dual cathode follower 55 of the pulse collecting circuit 50 are connected to the control grid of a hydrogen thyratron 86 of a cable pulsing circuit 85 through a coupling capacitor 88. The control grid of the hydrogen thyratron 86 is also connected to a negative direct current potential through an inductor 90. An energy storing network 92 which includes a first capacitor 94, a second capacitor 96 and a coil 98 is connected between ground and the anode of the hydrogen thyratron 86, which anode is also connected through a resistor 100 to the B+ supply. The energy storing network 92 may be, as is well known, an appropriate length of coaxial cable. A cathode resistor 102 is connected between the cathode of the hydrogen thyratron 86 and ground. A coupling capacitor 104 is connected between the cathode of the hydrogen thyratron 86 and the central conductor 22 of the single conductor cable 20. A borehole power supply 106 is also connected to the central conductor 22 of the single conductor cable 20 through a filter network 108 which includes a capacitor 110 connected between borehole power supply 106 and ground and an inductor 112 which is connected between the borehole power supply 106 and the central conductor 22 of the single conductor cable 20.

The surface equipment of the acoustical velocity well logging system of the present invention is illustrated in FIG. 2. As shown in this figure the single conductor cable 20 passes over a cable measuring device 114. The central conductor of the single conductor cable 20 is connected to a filter 116 which is suitable for separating the borehole power energy from the acoustic velocity intelligence which is being transmitted through the same conductor, that is, the central conductor 22. The power necessary to energize the exploring unit is derived from the 60 cycle per second power source 118, which is connected to the filter 116. The 60 cycle per second power source 118 also is connected to the surface power supply 120.

The filter 116 also is connected to an amplifier and shaper 122. The output of the amplifier and shaper 122 is connected to a first trigger thyratron circuit 124 which may include a thyratron tube 126 having a cathode resistor 128, an anode resistor 130 and a storage capacitor 132 connected between the anode of the thyratron 126 and ground. The cathode of the thyratron 126 is connected to a first time measuring circuit which includes a first bi-stable multivibrator 134 to which is connected a first sawtooth generator 136 followed by a first peak reading vacuum tube voltmeter 138. The output from the first peak reading vacuum tube voltmeter 138 is applied to a first recorder 140 through a first direct current voltage amplifier 142.

The output from the amplifier and shaper 122 is also applied to a first first-pulse deletion circuit 144. The first-pulse deletion circuit 144 comprises a conventional one shot multivibrator 146 having a first triode 148 and a second triode 150. The amplifier and shaper 122 is connected, more particularly, to the control grid of the first triode 148 of the first-pulse deletion circuit 144 through a coupling resistor 152. The anode of the second triode 150 of the one-shot multivibrator 146 is connected through a first resistor 154 connected in series with the parallel combination of a second resistor 156 and a capacitor 158 to a B− supply. Also connected to the output of the amplifier and shaper 122 is a first load resistor 160 connected thereto through a first coupling capacitor 162. A silicon diode 164, which is preferably a 1–N–646, is connected between the first load resistor 160 and the common point between the first resistor 154 and the second resistor 156. A second load resistor 166 is connected between the common point of the first coupling capacitor 162 and the first load resistor 160 and ground. A second coupling capacitor 168 is connected between the common point of the first load resistor 160 and the silicon diode 164 and a grid resistor 170. The grid resistor 170 is connected between the control grid of a cathode follower 172 and a negative direct current potential or bias source. The anode of the cathode follower 172 is connected directly to the B+ supply and the cathode of the cathode follower 172 is connected through a cathode resistor 174 to ground. The cathode of the cathode follower 172 is connected to a second trigger thyratron 176 which may be similar to the first trigger thyratron 124. The output of the second trigger thyratron 176 is connected to an input of the first bi-stable multivibrator 134 of the first time measuring circuit.

The output of the second trigger thyratron 176 is also connected to second and third time measuring circuits which may be similar to the first time measuring circuit. The second time measuring circuit includes the second bi-stable multivibrator 178, a second sawtooth generator 180, a second peak reading vacuum tube voltmeter 182, a second direct current amplifier 184 and a second recorder 186. The third time measuring circuit includes a third bi-stable multivibrator 188, a third sawtooth generator 190, a third peak reading vacuum tube voltmeter 192, a third direct current amplifier 194 and a third recorder 196.

The cathode of the cathode follower 172 also is connected to a second first-pulse deletion circuit 198 which is similar to the first first-pulse deletion circuit 144. The output from the second first-pulse deletion circuit 198 is connected to a third trigger thyratron 200 which is similar to the first and second trigger thyratrons 124 and 176. The output from the third trigger thyratron 200 is applied to an input of the second bi-stable multivibrator 178 of the second time measuring circuit. The output from the second first-pulse deletion circuit 198 also is connected to a third first-pulse deletion circuit 202, the output of which is connected to an input of the third bi-stable multivibrator 188.

In the operation of the acoustical velocity well logging system of the present invention, an electric pulse $t_0$ produced by the timer unit 38 is applied to the acoustic transmitter pulser 40 which produces a sharp high-energy electric pulse for actuating the acoustical transmitting transducer 28. The electric pulse $t_0$ from the timer unit 38 is simultaneously applied through the blocking diode 84 to the control grid of the second triode section 56 of the dual cathode follower 55 to produce a pulse $t_0$ across the cathode resistor 58 of the dual cathode follower 55. The electric pulse $t_0$ from the timer unit 38 is also simultaneously applied to the first delayed gate generator 42 which, after a delay of approximately 100 microseconds, produces a positive square wave having a duration of approximately 600 microseconds which is applied to the first gated trigger generator 44 to place this generator in condition to operate upon the receipt therein of a pulse from the first amplifier and clipper 48.

The acoustic pulse $T_0$ produced at the transmitting transducer 28 travels through the borehole fluid into the subsurface formation 14 where a portion of it is refracted through the formation 14 toward the first, second and third receiving transducers 30, 32 and 34. A portion of the refracted acoustic pulse or wave reenters the borehole fluid to strike the first receiving transducer 30 and at a later time depending upon the acoustic properties of the formation 14 another portion of the refracted wave reenters the borehole fluid to strike the second receiving transducer 32 and at a still later time still another portion of the refracted wave reenters the borehole fluid to strike the third receiving transducer 34. The voltage developed by the first receiving transducer 30 corresponding to the acoustic energy received thereby is applied to the first amplifier and clipper 48 through the first filter 46. The pulse from the output of the first amplifier and clipper 48 is applied to the first gated trigger generator 44 to produce at the output thereof a single pulse $t_1$ which is applied to the control grid of the first triode section 54 of the dual cathode follower 55 setting up the pulse $t_1$ across the cathode resistor 58. It should be understood that due to the ringing of the transmitting transducer 28 a wave train rather than a single pulse will be received at the receivers 30, 32 and 34. In order to produce a single pulse $t_1$ indicative of the instant at which the first wave of the wave train reaches the first receiving transducer 30, the first gated trigger generator is designed so that the first wave of the wave train triggers the generator 44 to produce the pulse $t_1$ and generator 44 remains unresponsive to the remaining waves of the wave train. This may be readily accomplished by providing an energy storage network which discharges at the instant of arrival of the first wave of the wave train but does not become recharged until after the wave train has passed.

A portion of the voltage developed across the output of the first gated trigger generator 44 is applied to the second delayed gate generator 64 which after a delay of approximately 30 microseconds produces a positive pulse or wave having a duration of approximately 200 microseconds at its output. The 200 microsecond positive pulse is applied to the second gated trigger generator 70 to place the second gated trigger generator 70 in a condition to operate when a pulse is received therein from the second amplifier and clipper 68.

The voltage wave train developed across the second receiving transducer 32 corresponding to the acoustic energy received thereby is applied to the second amplifier and clipper 68 through the second filter 66. The first wave of the wave train from the output of the second amplifier and clipper 68 is applied to the second gated trigger generator 70 to produce at the output thereof an electric pulse $t_2$ indicative of the instant of arrival of the acoustic energy at the second receiving transducer 32. The electrical pulse $t_2$ is applied through the second blocking diode 72 to the control grid of the second triode section 56 of the dual cathode follower 55 to produce across the cathode resistor 58 the electric pulse $t_2$.

The electrical pulse $t_2$ produced at the output of the second gated trigger generator 70 is also applied to the third delayed gate generator 74 which after a delay of approximately 60 microseconds produces a positive pulse or wave having a duration of approximately 400 microseconds at its output. The 400 microsecond positive pulse from the third delayed gate generator 74 is applied to the third gated trigger generator 80 to place this generator in a condition to operate upon the arrival of a pulse from the third amplifier and clipper 78.

The voltage wave train developed across the third receiving transducer 34 corresponding to the acoustic energy received thereby is applied to the third amplifier and clipper 78 through the third filter 76. The first wave of the wave train from the output of the third amplifier and clipper 78 operates the third gated trigger generator 80 to produce at the output thereof a fourth electrical pulse $t_3$ which is applied through the third blocking diode 82 to the control grid of the first triode section 54 of the dual cathode follower 55 to produce the electric pulse $t_3$ across the cathode resistor 58.

Accordingly, it can be seen that the four pulses $t_0$, $t_1$, $t_2$ and $t_3$, each of which are indicative of the instant at which a portion of energy of an acoustic pulse was present at the respective transducers, are produced across the cathode resistor 58 of the dual cathode follower 55 of the pulse collecting circuit 50. The four pulses produced across the cathode resistor 58 are then applied to the control grid of the hydrogen thyratron 86 of the cable pulsing circuit 85 through the coupling capacitor 88. The pulse $t_0$ first fires the hydrogen thyratron 86 discharging the energy stored in the storage network 92 to produce a high-amplitude short-duration pulse across the cathode resistor 102 of the hydrogen thyratron 86. As the energy from the storage network 92 is discharged, the hydrogen thyratron 86 will extinguish and the storage network will be rapidly recharged by the energy from the B+ supply through the charging resistor 100 so as to await the arrival of the second pulse $t_1$. The choke 90 and the negative direct current voltage applied through the choke 90 to the control grid of the hydrogen thyratron 86 are provided so as to rapidly deionize the thyratron 86. The cable pulsing circuit responds to the subsequent pulses, that is, pulses $t_1$, $t_2$ and $t_3$, in a similar manner to produce across the cathode resistor 102 the four pulses $t_0$, $t_1$, $t_2$ and $t_3$. These four pulses are then applied to the central conductor 22 of the single conductor cable 20 through the coupling capacitor 104.

It should be understood that the B+ supply, the negative direct current or bias voltage and the filament voltage for the circuits contained in the exploring unit 18 are all derived from the borehole power supply 106 which is illustrated merely in block form since it may be of the conventional type and would unduly complicate the drawing if illustrated in detail. The borehole power supply 106 is energized by a 60 cycle per second power source 118 located at the surface of the earth. The 60 cycle energy is fed from the cable 20 to the borehole power supply 106 through the inductor 112. The inductor 112 and the capacitor 110 are provided to prevent the pulses $t_0$, $t_1$, $t_2$ and $t_3$ from entering into the borehole power supply 106. The voltage from the 60 cycle power source 118 is 280 volts so as to provide 240 volts at the input of the power supply 106 since a 40 volt drop in the cable 20 was encountered. However, as understood by those skilled in the art, this voltage may be varied depending upon the circuits or elements used in the acoustical well logging system. The surface power supply 120 which is also energized by the 60 cycle per second power supply 118 supplies the B−, B+, negative direct current or bias potential and filament voltage to the surface equipment. Since the surface power source may also be a conventional power supply, details thereof have not been disclosed. The 60 cycle per second voltage from the power source 118 is applied to the central conductor 22 of the single conductor cable 20 through the filter 116.

The four electric pulses $t_0$, $t_1$, $t_2$ and $t_3$ transmitted up the single conductor cable 20 are applied through filter 116 to the amplifier and shaper 122 which produces at its output sharp pulses $t'_0$, $t'_1$, $t'_2$ and $t'_3$ of substantially equal amplitude. These pulses correspond with the pulses produced at the cathode of the hydrogen thyratron 86 of the cable pulsing circuit except that they are displaced from the pulses $t_0$, $t_1$, $t_2$ and $t_3$ produced at the hydrogen thyratron 86 by an amount equal to the time delay in transmission through the single conductor cable. This time delay may be in the order of 50 microseconds. However, since each of the four pulses are transmitted by the same conductor in the cable 20, they are delayed by the same amount, and, therefore, the time interval between the pulses $t_0$ and $t_1$ is the same as that between $t'_0$ and $t'_1$, and the time interval between $t_1$ and $t_2$ is the same as that between $t'_1$ and $t'_2$, etc. The four pulses $t'_0$, $t'_1$, $t'_2$ and $t'_3$ from the amplifier and shaper 122 are applied to the control grid of the first trigger thyratron 124. The first pulse, that is, $t'_0$, triggers the thyratron 126 which discharges the energy stored in the storage capacitor 132 through the cathode resistor 128 to produce the pulse $t'_0$ across the resistor 128. Since the charge resistor 130 has a high resistance value, the storage capacitor 132 cannot be immediately recharged and, therefore, the subsequent pulses $t'_1$, $t'_2$, and $t'_3$ will not be capable of triggering thyratron 126. The values of the charging resistor 130 and the storage capacitor 132 are such that the storage capacitor 132 will be sufficiently recharged to again discharge through the thyratron 126 when the next series of pulses $t'_0$, $t'_1$, $t'_2$ and $t'_3$ are applied to the grid of the thyratron 126.

The four pulses $t'_0$, $t'_1$, $t'_2$ and $t'_3$ from the amplifier and shaper 122 also are applied to the control grid of the first triode 148 of the one shot multivibrator 146 through the grid resistor 152. The first triode section 148 is normally in a non-conducting condition and the second triode section 150 of the one shot multivibrator is normally in a conducting condition. When the first pulse, that it, pulse $t'_0$, is applied to the grid of the first triode section 148 the first triode section is placed in a conducting condition and the second triode section then becomes nonconductive. Thus, the voltage at the anode of the second triode section 150 begins to increase to form a positive-going pulse. The time constant of the multivibrator 146 is such that the positive going pulse at the anode of the second triode section 150 has a duration of approximately 1400 microseconds. The pulse $t'_0$ from the amplifier and shaper 122 also is applied through the coupling capacitor 162 to the first load resistor 160 and then to ground through the normally conducting silicon diode 164, the capacitor 158 and the B− supply. The silicon diode 164 and the capacitor 158 are very low impedances for the pulse $t'_0$ and, therefore, the voltage at the common point between the load resistor 160 and the silicon diode 164 is of a very small value and not sufficient to overcome the negative bias on the control grid of the cathode follower 172. Consequently, a pulse $t'_0$ is not produced across the cathode resistor 174 of the cathode follower 172. At the time that the subsequent pulse, that is pulse $t'_1$, from the amplifier and shaper 122 is applied to the first load resistor 160, the silicon diode 164 is rendered non-conductive by the positive pulse from the anode of the second triode section 150 of the one shot multivibrator 146. Accordingly, this pulse $t'_1$ and pulses $t'_2$ and $t'_3$ will be passed through the coupling capacitor 168 to the control grid of the cathode follower 172 to produce corresponding voltages across the cathode resistor 174. The second load resistor 166 is provided to complete the direct current path for the silicon diode 164 while that diode is conducting.

The pulses $t'_1$, $t'_2$ and $t'_3$ now being separated from the pulse $t'_0$ in the first first-pulse deletion circuit 144 can be applied to the second trigger thyratron circuit 176. Since the second trigger thyratron circuit 176 is similar to the first trigger thyratron circuit 124 the first pulse applied thereto, that is, pulse $t'_1$, will be produced at the output thereof while the pulses $t'_2$ and $t'_3$ will be prevented from passing through the second thyratron 176.

Since the pulses $t'_0$ and $t'_1$ have been separated from the series of pulses $t'_0$, $t'_1$, $t'_2$ and $t'_3$, it can be readily seen that these two pulses may be applied to a time measuring circuit so as to determine the time interval required for the acoustic pulse to travel between the acoustical transmitting transducer 28 and the first receiving transducer 30. As illustrated in FIG. 2 of the drawing the pulse $t'_0$ at the cathode of the thyratron 126 of the first trigger thyratron circuit 124 is applied to the first bi-stable multivibrator 134 to produce a negative-going pulse or wave at the output thereof. The negative-going wave at the first bi-stable multivibrator 134 is terminated by the application thereto of the pulse $t'_1$ from the second trigger thyratron 176. The negative-going pulse at the output of the first multivibrator 134 which has a duration equal to the time of travel of the acoustic pulse $T_0$ between the transmitting transducer 28 and the first receiving transducer 30 is applied to the first sawtooth generator 136 to produce a sawtooth wave having a maximum amplitude which is proportional to the time of travel of the acoustic pulse between transmitting transducer 28 and the receiving transducer 30. The first peak reading vacuum tube voltmeter 138 detects the peak value of the sawtooth wave, which, after suitable amplification by the first direct current voltage amplifier 142, is recorded by the first recorder 140. The first recorder 140 and also the second and third recorders 186 and 196 may be driven by coupling means 115 connected to the cable measuring device 114.

To determine the time of travel of the acoustic pulse $T_0$ between the first and second receiving transducers 30 and 32, the pulse $t'_1$ is applied from the second trigger thyratron circuit 176 to the second bi-stable multivibrator 178 of the second time measuring circuit to initiate a negative-going wave at the output of the multivibrator 178. The pulse $t'_2$, being needed to terminate this negative-going wave, is provided by applying the pulse $t'_1$, $t'_2$ and $t'_3$ from the output of the first first-pulse deletion circuit to the second first-pulse deletion circuit 198 which passes only pulses $t'_2$ and $t'_3$ in a manner similar to that described in connection with the first first-pulse deletion circuit 144. The pulses $t'_2$ and $t'_3$ are then applied to the third trigger thyratron circuit 200 at the output of which only the pulse $t'_2$ appears. The negative-going wave at the output of the second multivibrator 178, thus has a time duration equal to the time of travel of the acoustic pulse $T_0$ between the first receiving transducer 30 and the second receiving transducer 32. The negative pulse at the output of the second bi-stable multivibrator 178 is then applied to the second sawtooth generator 180 which produces a sawtooth voltage having a peak value proportional to the time interval between pulse $t'_1$ and $t'_2$. The second peak reading vacuum tube voltmeter 182 and the second direct current voltage amplifier 184 are used to provide a direct current voltage indicative of the time interval between $t'_1$ and $t'_2$ which may be recorded in the second recorder 186, in a manner similar to that described in connection with the first time measuring circuit.

To determine the travel time of the acoustic pulse between the first receiving transducer 30 and the third receiving transducer 34, the pulses $t'_1$ and $t'_3$ are applied to the third bi-stable multivibrator 188. Pulse $t'_3$ is separated from the pulse $t'_2$ at the output of the second first-pulse deletion circuit 198 by applying these pulses, $t'_2$ and $t'_3$, to the third first-pulse deletion circuit 202. Thus, the time of travel of the acoustic pulse between the first receiving transducer 30 and the third receiving transducer 34 may be readily recorded by the third time measuring circuit which includes the third bi-stable multivibrator 188, the third sawtooth generator 190, the third peak reading vacuum tube voltmeter 192, the third direct current voltage amplifier 194 and the third recorder 196.

It can be seen that in the acoustical velocity well logging system of the present invention, pulses $t_0$, $t_1$, $t_2$ and $t_3$ representing instances of time at which an acoustic pulse $T_0$ is present at a particular transducer are produced in an exploring unit, are collected therein and transmitted through a single channel to the surface of the earth where they are separated and applied to selected time measuring circuits. It should be understood that additional time measuring circuits may be utilized at the surface to accommodate any desired combination of the pulses transmitted to the earth's surface. Furthermore, it should be understood that additional receiving transducers may be added to the exploring unit 18 and that the spacing of the receiving transducers from each other and from the transmitting transducer may be varied so as to produce desired results. The number of receiving transducers and the spacing therein is controlled merely by the strength of the acoustic wave or pulse produced by the transmitting transducer.

Accordingly, it can be seen that an improved acoustic velocity well logging system has been provided which produces simultaneously a plurality of acoustical logs of subsurface formations traversed by a borehoe including both single receiver and two-receiver logs. Moreover, the plurality of logs are produced simultaneously with the use of a borehole cable which has only a single insulated conductor.

Obviously, many modifications and variations of the invention as hereinbefore set forth, may be made without departing from the spirit and scope thereof, and therefore only such limitations should be imposed as are indicated in the appended claims.

We claim:

1. An acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting acoustic pulses at predetermined time intervals through a subsurface formation opposite said tool, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, a single insulated conductor, means for applying said first, second and third electric pulses to one end of said single conductor, first and second time measuring circuits, means coupled to the other end of said single insulated conductor for applying a different pair selected from said first, second and third electric pulses to each of said time measuring circuits so as to measure the time interval between the respective pulses of the selected pairs of said electric pulses.

2. A system for determining acoustic velocities through a subsurface formation traversed by a borehole comprising means for transmitting an acoustic pulse through the subsurface formation from first to second to third spaced apart points in the borehole, means for producing first, second, and third electric pulses in predetermined time-relationship with said acoustic pulse at said first, second and third points, respectively, a single transmission line, means for applying said first, second and third electric pulses to one end of said single transmission line, and means operatively coupled to the opposite end of said transmission line for selectively separating said first, second and third electric pulses into at least two different pairs of electric pulses, and means operatively coupled to said pulse separating means for measuring the time interval between the respective electric pulses of said different pairs selected from said first, second and third electric pulses.

3. An acoustical velocity well logging system comprising an elongated tool adapted to be passed through the borehole of the well, said tool having first, second and third transducers positioned in fixed spaced apart relationship in said tool, means for transmitting an acoustic pulse at predetermined time intervals through the subsurface formation opposite said elongated tool, means for producing a first electric pulse at the occurrence of a given one of said acoustic pulses at said first transducer, means for producing a second electric pulse on the arrival of said given acoustic pulse at said second transducer, means for producing a third electric pulse upon the arrival of said given acoustic pulse at said third transducer, a single transmission line, a cable pulsing circuit coupled to said transmission line, said cable pulsing circuit being operatively associated with said means for producing said first, second and third electric pulses such that said cable pulsing circuit is responsive to each of said first, second and third electric pulses, said cable pulsing circuit including a pulse forming network and a fast-acting switch for applying high-power, short-duration pulses to one end of said transmission line, first and second time measuring circuits, means for deriving from said transmission line a first pair of said first, second and third electric pulses and for applying said first pair of electric pulses to said first time measuring circuit and for deriving from said transmission line a second pair of said first, second and third electric pulses and for applying said second pair of electric pulses to said second time measuring circuit.

4. An acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting an acoustic pulse at predetermined time intervals through a subsurface formation opposite said transducers, means for producing a first electric pulse at the occurrence of a given one of acoustic pulses at said first transducer, means for producing a second electric pulse upon the arrival of said given acoustic pulse at said second transducer, means for producing a third electric pulse on the arrival of said given acoustic pulse at said third transducer, a single transmission line, a cable pulsing circuit for applying high-power, short-duration pulses to one end of said transmission line, means for collecting said first, second and third pulses and for applying them to the input of said cable pulsing circuit, a plurality of time measuring circuits and means coupled to the other end of said single transmission line including a separate circuit for deriving each of said first, second and third electric pulses for applying a first pair of said electric pulses to one of said plurality of time measuring circuits and a second pair of said electric pulses to another of said plurality of measuring circuits.

5. An acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting an acoustic pulse at predetermined time intervals through a subsurface formation opposite said tool, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, a single transmission line, means operatively associated with said means for producing said first, second and third electric pulses and responsive to said electric pulses for producing high-power, short-duration pulses, means for applying the high-power, short-duration pulses to one end of said transmission line, first and second time measuring circuits, means coupled to the opposite end of said transmission line for applying a first pair of said short-duration electric pulses to said first time measuring circuit and for applying a second pair of said electric pulses to said second time measuring circuit, an electric power source, first filter means for connecting said power source to said opposite end of said transmission line and for separating said first, second and third electric pulses from the energy derived from said source, means disposed at said one end of said second transmission line for receiving the energy from said power source, and second filtering means disposed between said energy receiving means and said single transmission line for preventing said first, second and third electric pulses from entering said energy receiving means.

6. An acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting acoustic pulses at predetermined time intervals through a subsurface formation opposite said tool, means for producing an electric pulse on the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, a single transmission line, means for applying said electric pulses to one end of said single transmission line, first and second time measuring circuits each including a scale-of-two circuit, means coupled to the other end of said single transmission line for applying a first pair of said electric pulses to said first time measuring circuit and for applying a second pair of said electric pulses to said second time measuring circuit.

7. An acoustical velocity well logging system comprising an elongated tool adapted to be passed through the borehole of a well, said tool having a transmitting transducer and first, second and third receiving transducers, said transducers being positioned longitudinally in fixed spaced apart relationship in said tool, means for producing a first electric pulse for actuating said transmitting transducer to produce an acoustic pulse for passage through a subsurface formation opposite said tool, means for collecting electric pulses, means for applying said first electric pulse to said pulse collecting means, means for producing a second electric pulse upon the arrival of said acoustic pulses at said first receiving transducer, means for applying said second electric pulses to said pulse collecting means, means for producing a third electric pulse upon the arrival of said acoustic pulse at said second receiving transducer, means for applying said third electric pulse to said pulse collecting means, means for producing a fourth electric pulse upon the arrival of said acoustic pulse at said third receiving transducer, means for applying said fourth electric pulse to said pulse collecting means, a single transmission line, means responsive to said electric pulses for producing high-power, short-duration electric pulses, means for applying said high-power, short-duration pulses to one end of said single line for transmission therethrough, means coupled to the opposite end of said single transmission line for deleting said first short-duration pulse and passing said second, third and fourth short-duration pulses, first and second time measuring circuits, means for applying said second and third short-duration pulses to said first time measuring circuit and means for applying said second and fourth short-duration pulses to said second time measuring circuit for measuring the time of travel of said given acoustic pulse between said first and second receiving transducers and between said first and third receiving transducers, respectively.

8. A acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting acoustic pulses at predetermined time intervals through a subsurface formation opposite said tool, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, a single transmission line, means for applying said first, second and third electric pulses to said transmission line to form a train of pulses therein, time measuring means for measuring the interval between a pair of electric pulses, means operatively coupled to the opposite end of said transmission line for separating each of the first, second and third electric pulses from said train of pulses and for applying a selected plurality of pairs of said separated pulses to said time measuring means to measure the time interval between the respective pulses of each of the plurality of pairs of pulses.

9. An acoustical velocity well logging system comprising an elongated tool adapted to be passed through the borehole of a well, said tool having first, second and third transducers positioned in fixed spaced apart relationship in said tool, said transducers being mounted for acoustic communication with material including a subsurface formation opposite said tool, means for transmitting acoustic pulses at predetermined time intervals through a subsurface formation opposite said tool, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, a single transmission line, means for applying said electric pulses to one end of said transmission line to form therein a train of pulses, a plurality of time measuring circuits, means for separating each of the pulses from said train of pulses and means for applying a different pair of the separated pulses to each of said plurality of time measuring circuits.

10. An acoustical velocity well logging system as set forth in claim 9 wherein said pulse separating means includes a plurality of circuits for deleting a first pulse of a series of pulses applied thereto and a plurality of circuits for passing only the first pulse of a series of pulses applied thereto.

11. An acoustical velocity well logging system as set forth in claim 10 wherein each of said pulse deletion circuits includes a diode and a one shot multivibrator having the output applied to said diode to render said diode inoperative for a predetermined portion of time following the application thereto of a first pulse of a series of pulses and wherein said first pulse passing circuit includes a thyratron adapted to be discharged only once upon the arrival thereat of a series of pulses during a predetermined interval of time.

12. An acoustical velocity well logging system comprising an elongated tool adapted to be passed through the borehole of a well, said tool having an acoustical transmitting transducer and first, second and third receiving transducers, said transducers being positioned longitudinally in fixed spaced apart relationship in said tool, means for producing a first electric pulse for actuating said transmitting transducer to produce an acoustic pulse for passage through a subsurface formation opposite said tool, means for producing a second electric pulse upon the arrival of said acoustic pulse at said first receiving transducer, means for producing a third electric pulse upon the arrival of said acoustic pulse at said second receiving transducer, means for producing a fourth electric pulse upon the arrival of said acoustic pulse at said third receiving transducer, a single transmission line, means for applying said first, second, third and fourth electric pulses to one end of said transmission line, first, second and third time measuring circuits, each of said time measuring circuits including a bi-stable multivibrator and means coupled to the opposite end of said transmission line for applying selected pairs of said electric pulses to said time measuring circuits, said means for applying said electric pairs of said electric pulses including first means coupled to the opposite end of said single transmission line for passing only said first electric pulse, the output of said first means being applied to the bi-stable multivibrator of said first time measuring circuit, a first first-pulse deletion circuit coupled to the opposite end of said transmission line, second means coupled to the output of said first first-pulse deletion circuit for passing only said second electric pulse, the output of said second means being applied to the bi-stable multivibrator of each of the time measuring circuits, a second first-pulse deletion circuit coupled to the output of said first first-pulse deletion circuit, third means coupled to the output of said second first-pulse deletion circuit for passing only said third electric pulse, the output of said third means being applied to the bi-stable multivibrator of said second time measuring circuit and a third first-pulse deletion circuit coupled to the output of said second first-pulse deletion circuit, the output of said third first-pulse deletion circuit being applied to the bi-stable multivibrator of said third time measuring circuit.

References Cited in the file of this patent
UNITED STATES PATENTS

| | | |
|---|---|---|
| 2,651,027 | Vogel | Sept. 1, 1953 |
| 2,708,485 | Vogel | May 17, 1955 |
| 3,018,839 | Isaacson | Jan. 30, 1962 |